A. B. BEITMAN.
WIND SHIELD CLEANER.
APPLICATION FILED JAN. 6, 1911.
993,816.
Patented May 30, 1911.
2 SHEETS—SHEET 2.
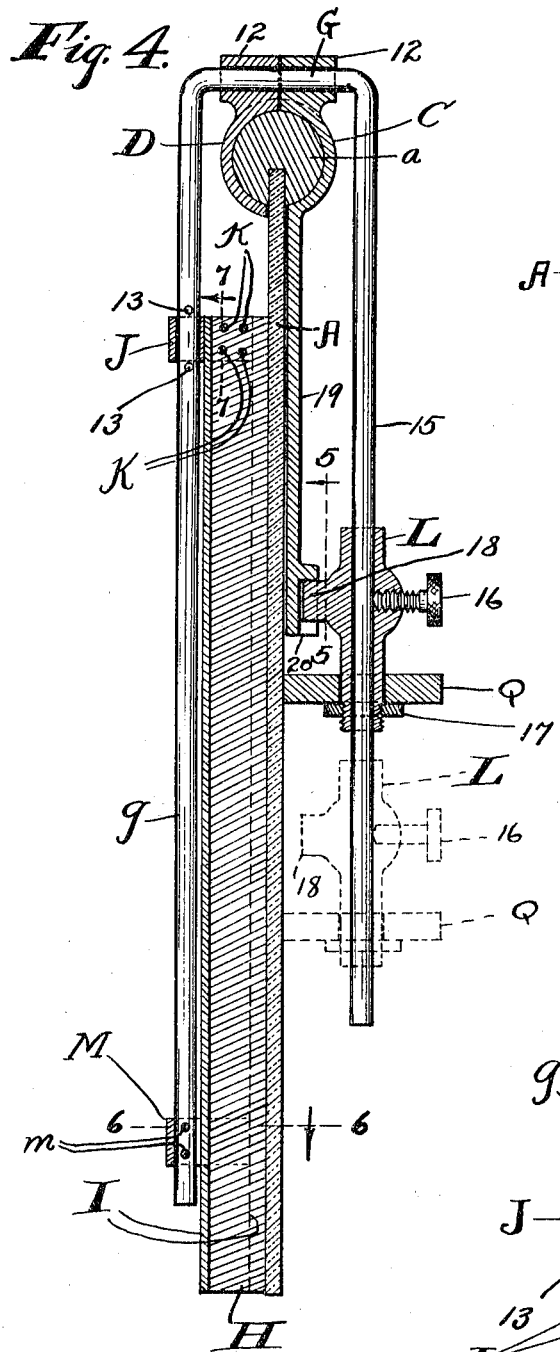
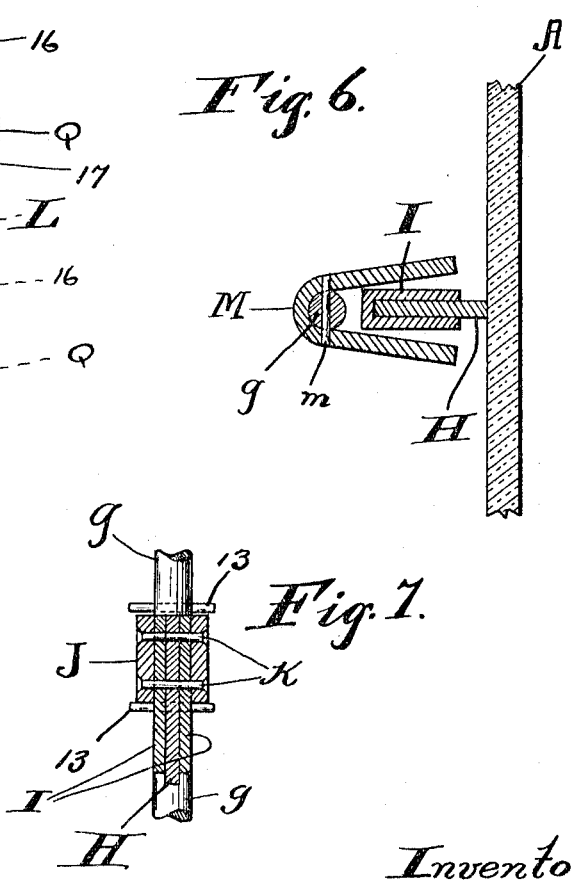
Witnesses:
H. J. Gettins
B. C. Brown
Inventor:
Albert B. Beitman
By Andrson
his Attorneys

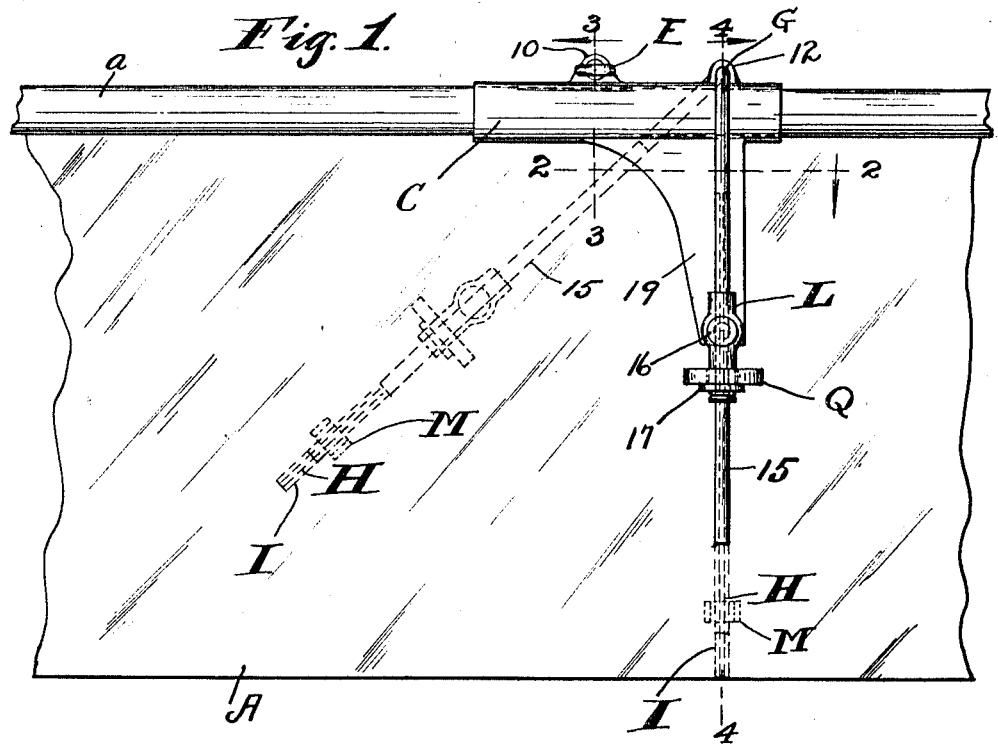
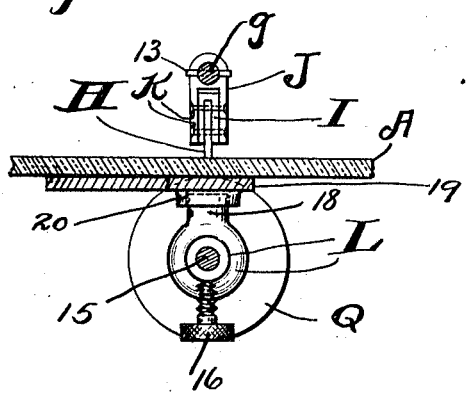
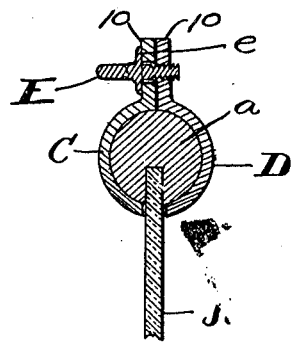

UNITED STATES PATENT OFFICE.

ALBERT B. BEITMAN, OF EAST CLEVELAND, OHIO.

WIND-SHIELD CLEANER.

993,816.  Specification of Letters Patent.  Patented May 30, 1911.

Application filed January 6, 1911. Serial No. 601,100.

*To all whom it may concern:*

Be it known that I, ALBERT B. BEITMAN, a citizen of the United States of America, residing at East Cleveland, in the county of Cuyahoga and State of Ohio, have invented certain new and useful Improvements in Wind-Shield Cleaners; and I hereby declare the following to be a full, clear, and exact description of the invention, such as will enable others skilled in the art to which it pertains to make and use the same.

This invention relates to improvements in cleaners for window-panes or transparent screens employed as wind-shields on automobiles or other vehicles.

This invention consists more especially in a wind-shield cleaner comprising the following:—a wiper arranged to extend over and make contact with the outer side of an upright window-pane or transparent screen which constitutes the said wind-shield; a shaft arranged to extend transversely of an edge of the said pane or screen and supporting the wiper or cleaner; a bracket supporting the said shaft and capable of being shifted longitudinally of the said edge upon the application of the wind-shield cleaner to the said pane or screen, and means whereby the shaft may be locked to the bracket and oscillation of the shaft during the shifting of the bracket along the aforesaid edge is prevented so that when the shaft is locked to the bracket and the wiper is arranged substantially at a right angle to the said edge a shifting of the bracket longitudinally of the said edge moves the wiper as required to substantially wipe the entire outer side of the pane or screen, and so that the shaft, when unlocked from the bracket, may be oscillated in the one or the other direction to swing the wiper over the said side of the pane or screen in a vertical plane to wipe enough of the said side to afford a suitable outlook temporarily to the chauffeur, motorman or operative.

Another object is to provide the aforesaid shaft with a lever arranged to extend over the inner side of the pane or screen and to have the aforesaid shaft-locking means capable of locking the said lever to the shaft-supporting bracket so that the said lever, and consequently the shaft, may be quickly unlocked from the bracket at the inner side of the pane or screen and so that the chauffeur, motorman or operative is enabled to insure the maintenance of an adequate outlook with facility.

Another object is to provide the said lever with a friction-wheel which frictionally engages the inner side of a pane or screen and thereby prevents vibration of the lever when the lever is unlocked from the bracket.

With these objects in view, and to the end of rendering the construction simple and durable and not liable to get out of order, this invention consists in certain structural features and combinations and arrangement of parts, hereinafter described, pointed out in the claims, and illustrated in the accompanying drawings.

In the said drawings, Figure 1 is an inner side view of a portion of a wind-shield provided with a cleaner embodying my invention. Fig. 2 is a horizontal section on line 2—2, Fig. 1, looking downwardly. Fig. 3 is a vertical section on line 3—3, Fig. 1, looking in the direction indicated by the arrow. Fig. 4 is a vertical section on line 4—4, Fig. 1, looking in the direction indicated by the arrow. Fig. 5 is a vertical section on line 5—5, Fig. 4, looking in the direction indicated by the arrow. Fig. 6 is a horizontal section on line 6—6, Fig. 4, looking downwardly. Fig. 7 is a vertical section on line 7—7, Fig. 4, looking outwardly. Figs. 2, 3, 4 and 5 are drawn on a larger scale than Fig. 1. Figs. 6 and 7 are drawn on a larger scale than Figs. 2, 3, 4 and 5.

The wind-shield illustrated comprises a vertically arranged window pane or screen A of glass or other transparent material. A bar *a* is mounted on the top edge of the pane or screen A. The bar *a* is arranged horizontally and extends longitudinally of the said edge of the pane or screen. In applying the wind-shield to an automobile or other vehicle the wind-shield is supported or secured in position in any approved manner. The application and supporting of wind-shields on automobiles or other vehicles are too well understood in the art to require description and illustration in this specification.

My improved wind-shield cleaner comprises a sectional bracket mounted on and adjustable endwise of the bar *a* and consisting preferably of two sections C and D which embrace the inner side and outer side respectively of the said bar. The bracket-sections C and D are each provided at the top of the bar a (see Figs. 1 and 3) with an upwardly projecting lug 10 which is arranged adjacent the corresponding lug of the other bracket-section, and a thumb-screw E, which has a shoulder e abutting against the outer side of the lug 10 on one of the bracket-sections, extends loosely through the said lug and is screwed into the lug 10 of the other bracket-section. It will be observed therefore that the sectional bracket is adjustable endwise of the bar a and consequently longitudinally of the top edge of the pane or screen A and rendered loose relative to the said bar, or secured in the desired adjustment on the said bar, according as the screw E is rotated in the one or the other direction.

In suitable proximity to one end of the sectional bracket is located a shaft G which is arranged horizontally above and transversely of the bar a, and consequently above and transversely of the top edge of the pane or screen A. The shaft G extends through and has bearing in lugs 12 (see Fig. 4) formed on the bracket-sections C and D.

At the outer side of the pane or screen A is arranged a strip H of elastic material such, for instance, as rubber, which forms a wiper held in frictional contact with the said side of the pane or screen and normally in position extending vertically over the said side of the pane or screen. The wiper H is in the said position arranged substantially at a right angle to the top edge of the pane or screen, as shown in Fig. 4. Preferably the wiper H extends into a metal casing I which extends up and down the wiper, and at the outer side of the said casing the shaft G is provided with and preferably terminates in a depending arm g which extends longitudinally of the said casing and consequently longitudinally of the wiper. The shaft-arm g extends over and is spaced from the outer side of the pane or screen A.

The casing I is supported from the shaft-arm g in any approved manner. Preferably a metal strap J horizontally straddles the shaft-arm g at the upper end of the wiper H and overlaps the casing I at opposite sides of the casing, and the latter and the wiper are secured to the strap J by suitably applied pins K (see Figs. 4 and 7). The strap J is preferably interposed (see Figs. 4 and 7) between two pins 13 and 13 which extend through the shaft-arm g and a suitable distance beyond opposite sides of the said shaft-arm so that these pins prevent displacement of the strap J longitudinally of the said shaft-arm.

The shaft-arm g is provided near its lower extremity with a metal strap M which (see Figs. 4 and 6) is secured by suitably applied pins m to the said shaft-arm and horizontally straddles the casing I. The strap M is preferably loose relative to the casing I and prevents displacement of the said casing laterally relative to the shaft-arm g.

By the construction hereinbefore described it will be observed that the wiper H is arranged between the shaft-arm g and the outer side of the pane or screen A and extends longitudinally of and is connected to the said shaft-arm; that the casing I, straps J and M, pins K, m and 13 and the shaft-arm g form the component parts of a holder for the wiper, and that the wiper-holder thus formed extends over and is spaced from the outer side of the pane or screen A and connected to the shaft G so as to swing the wiper over the said side of the pane or screen during an oscillation of the shaft. The shaft G is provided at the inner side of the pane or screen A with and preferably terminates in a downwardly projecting or depending lever 15 for manually operating the shaft. The lever 15 and the shaft-arm g are preferably parallel as shown, and the said lever extends over and is spaced from the inner side of the pane or screen A. On the lever 15 is adjustably mounted a sleeve L which is secured in the desired adjustment on the said lever by a suitably applied set-screw 16. On the lower end of this sleeve is loosely mounted a friction-wheel Q which is shown resting on a nut 17 screwed onto the lower end of the sleeve. The wheel Q frictionally engages the inner side of the pane or screen A and prevents vibration of the lever 15 when the said lever is free to be swung in a vertical plane.

Means (see Figs. 4 and 5) for locking the lever 15 in the vertical position of the lever are provided and comprise a lug 18 which is formed on the sleeve L and projects in the said position of the lever when the said sleeve is in its upper position into a recess 20 formed in the lower end portion and extending up and down or longitudinally of an arm 19 depending from and integral with the bracket-section C. The arm 19 is arranged at and extends over the inner side of the pane or screen A between the latter and the lever 15. When the sleeve L is in its upper position and has its lug 18 engaging the recess 20, opposite side walls 21 of the recess (see Fig. 5) overlap opposite sides respectively of the said lug and thereby lock the lever 15 and consequently the shaft G and connected wiper-holder to the bracket-arm 19 and thereby prevent oscillation of the shaft during the shifting of the bracket longitudinally of the top edge of the pane or screen A. Obviously the recess 20 is arranged at the lever-facing side of the bracket-arm 19, and the said recess is open at its lower end to permit the lug 18 to pass into and out of the recess, and when therefore the sleeve is secured in the adjustment in which the said lug engages the said recess proper manipulation of the set-screw 16 renders the sleeve free to be lowered or readjusted on the lever 15 as required to lower the said lug out of the said recess, as shown in dotted lines, Fig. 4, so as to unlock the sleeve and consequently the said lever and connected wiper-holder relative to the shaft-supporting bracket and permit the said lever to be swung in a vertical plane to oscillate the shaft and thereby swing the wiper in a vertical plane over the outer side of the pane or screen A. I would here remark that the sleeve when thus lowered is secured in its lower position by tightening the set-screw 16 to prevent the sleeve from sliding downwardly off the lever. In dotted lines Fig. 1 the lever 15 and connected wiper-holder and wiper I are shown swung into an oblique position relative to the pane or screen A.

By the construction hereinbefore described it is obvious that when the sleeve L and connected shaft-lever, and consequently the wiper-holder, are locked to the shaft-supporting bracket and the latter is clamped to the bar $a$ by the thumb-screw E, proper manipulation of the said thumb-screw loosens the bracket-sections C and D relative to the said bar $a$ so as to render the bracket, and consequently the wiper-holder, free to be moved longitudinally of the bar $a$, and thereby enable the wiper to wipe approximately the entire outer side of the pane or screen A. On the other hand, upon loosening the said set-screw 16 to permit the sleeve L to lower so as to disengage its lug from the recess 20 the wiper-holder is unlocked from the shaft-supporting bracket and the said shaft is free to be oscillated and thereby swing the wiper over the outer side of the pane or screen A so as to wipe enough of the said side of the pane or screen to afford a temporarily suitable outlook through the pane or screen to the chauffeur, motorman or operative having charge of the shaft-operating lever.

What I claim is:—

1. A wind-shield cleaner comprising a shaft arranged to extend transversely of an edge of a window-pane or transparent screen; a suitably supported bracket bearing the shaft and adjustable longitudinally of the said edge, and a wiper-holder having a wiper which is arranged to make contact with and extend over the outer side of the pane or screen, said wiper-holder being connected to the shaft so as to swing the wiper over the said side of the pane or screen during an oscillation of the shaft.

2. A wind-shield cleaner comprising a shaft arranged to extend transversely of an edge of a window-pane or transparent screen; a suitably supported bracket bearing the shaft and adjustable longitudinally of the said edge; a wiper-holder having a wiper which is arranged to make contact with and extend over the outer side of the pane or screen, said wiper-holder being connected to the shaft so as to swing the wiper over the said side of the pane or screen during an oscillation of the shaft, and means for preventing oscillation of the shaft during the shifting of the bracket longitudinally of the aforesaid edge.

3. A wind-shield cleaner comprising a shaft arranged to extend transversely of an edge of a window-pane or transparent screen, which shaft is provided with a lever arranged to extend over the inner side of the pane or screen; a sleeve mounted on and adjustable endwise of the said lever and provided with a lug; a bracket bearing the shaft and adjustable longitudinally of the said edge, which bracket is provided with an arm arranged to extend over the inner side of the pane or screen and having a recess which has opposite side walls and extends longitudinally of the said arm, which recess is open at its outer end and arranged to be engaged by the aforesaid lug upon the required adjustment of the sleeve, and a wiper-holder having a wiper which is arranged to make contact with and extend over the outer side of the pane or screen, said wiper-holder being connected to the shaft so as to swing the wiper over the last-mentioned side of the pane or screen during an oscillation of the shaft.

4. A wind-shield cleaner comprising a bracket adjustable longitudinally of an edge of a window-pane or transparent screen; a wiper-holder having a wiper which is arranged to make contact with and extend over the outer side of the pane or screen, said wiper-holder being supported from the said bracket, and a friction-wheel supported from the bracket and arranged to engage the inner side of the pane or screen and roll in contact with the pane or screen during the movement of the bracket along the aforesaid edge.

5. A wind-shield cleaner comprising a shaft arranged to extend transversely of an edge of a window-pane or transparent screen, which shaft is provided with a lever arranged to extend over the inner side of the pane or screen; a bracket bearing the shaft and adjustable longitudinally of the said edge; a wiper-holder having a wiper which is arranged to make contact with and extend over the outer side of the pane or screen, said wiper-holder being connected to the shaft so as to swing the wiper over the last-mentioned side of the pane or screen during an oscillation of the shaft, and a friction-wheel supported from the lever and arranged to engage the inner side of the pane or screen.

6. The combination, with an upright window-pane or transparent screen forming a wind-shield, of a shaft arranged above and transversely of the top edge of the pane or screen, which shaft terminates at the outer side of the pane or screen in a depending arm which is spaced from the pane or screen, said shaft terminating at the inner side of the pane or screen in a downwardly projecting lever which is spaced from the pane or screen and arranged substantially parallel with the aforesaid arm; a suitably supported bracket bearing the shaft, and a wiper arranged between the aforesaid arm and the outer side of the pane or screen and extending longitudinally of and connected to the said arm.

7. The combination, with an upright window pane or transparent screen forming a wind-shield, of a shaft arranged above and transversely of the top edge of the pane or screen, which shaft is provided at the outer side of the pane or screen with a depending arm which is spaced from the pane or screen, said shaft being provided at the inner side of the pane or screen with a downwardly projecting lever which is spaced from the pane or screen; a wiper arranged between the aforesaid arm and the outer side of the pane or screen and extending longitudinally of and connected to the said arm; a suitably supported bracket bearing the shaft and adjustable longitudinally of the aforesaid edge, said bracket having a depending arm arranged at the inner side of the pane or screen between the lever and the pane or screen, said bracket-arm being provided at the lever-facing side of its lower end portion with a recess which has side walls and is open at its lower end; a sleeve adjustably mounted on the lever and having a member engaging the aforesaid recess in one position of the sleeve.

8. The combination, with an upright window pane or transparent screen, and a bar arranged adjacent and extending longitudinally of an edge of the pane or screen, of a bracket adjustable endwise of the said bar; means for securing the bracket in the desired adjustment; a shaft arranged transversely of the bar and supported from the bracket, which shaft terminates at the outer side of the pane or screen in an arm which extends over the said side of the pane or screen, said shaft being provided at the inner side of the pane or screen with a lever which extends over the last-mentioned side of the pane or screen, and a wiper supported from and arranged longitudinally of the aforesaid arm at the outer side of and in contact with the pane or screen.

In testimony whereof, I sign the foregoing specification, in the presence of two witnesses.

ALBERT B. BEITMAN.

Witnesses:
N. McDonnell,
B. C. Brown.